(12) United States Patent
Bae

(10) Patent No.: US 9,150,146 B2
(45) Date of Patent: Oct. 6, 2015

(54) LIGHT CONTROL APPARATUS AND METHOD FOR VEHICLE

(71) Applicant: HYUNDAI MOBIS CO., LTD., Seoul (KR)

(72) Inventor: Han Yeoung Bae, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/286,906

(22) Filed: May 23, 2014

(65) Prior Publication Data

US 2015/0145411 A1    May 28, 2015

(30) Foreign Application Priority Data

Nov. 22, 2013    (KR) .......................... 10-2013-0142893

(51) Int. Cl.
*B60Q 1/02* (2006.01)
*B60Q 1/14* (2006.01)

(52) U.S. Cl.
CPC .......... *B60Q 1/143* (2013.01); *B60Q 2300/314* (2013.01); *B60Q 2300/337* (2013.01)

(58) Field of Classification Search
CPC ................. B60Q 1/1423; B60Q 1/143; B60Q 2300/314; B60Q 2300/32; B60Q 2300/337

USPC ...................................................... 315/82, 77
See application file for complete search history.

(56) References Cited

U.S. PATENT DOCUMENTS

| | | | |
|---|---|---|---|
| 6,774,988 B2 * | 8/2004 | Stam et al. ..................... | 356/218 |
| 7,567,864 B2 * | 7/2009 | Ziehr et al. ...................... | 701/49 |
| 8,538,636 B2 * | 9/2013 | Breed .............................. | 701/49 |
| 2012/0206050 A1 * | 8/2012 | Spero ............................. | 315/152 |

FOREIGN PATENT DOCUMENTS

| | | |
|---|---|---|
| KR | 1020010067059 A | 5/2003 |
| KR | 10-2013-0112116 A | 10/2013 |

* cited by examiner

*Primary Examiner* — Dylan White
(74) *Attorney, Agent, or Firm* — Knobbe, Martens, Olson & Bear LLP

(57) ABSTRACT

A light control apparatus for a vehicle may include: an operation unit configured to receive a selection for an auto-light function; a control unit configured to determine whether or not a light operation condition is satisfied based on position information provided from a GPS module and plural pieces of information for operating a light unit, received through a wireless communication module, and output a light operating signal according to the determination result, when the auto-light function is selected through the operation unit; and a light control unit configured to operate a light unit according to the light operating signal provided from the control unit.

12 Claims, 3 Drawing Sheets

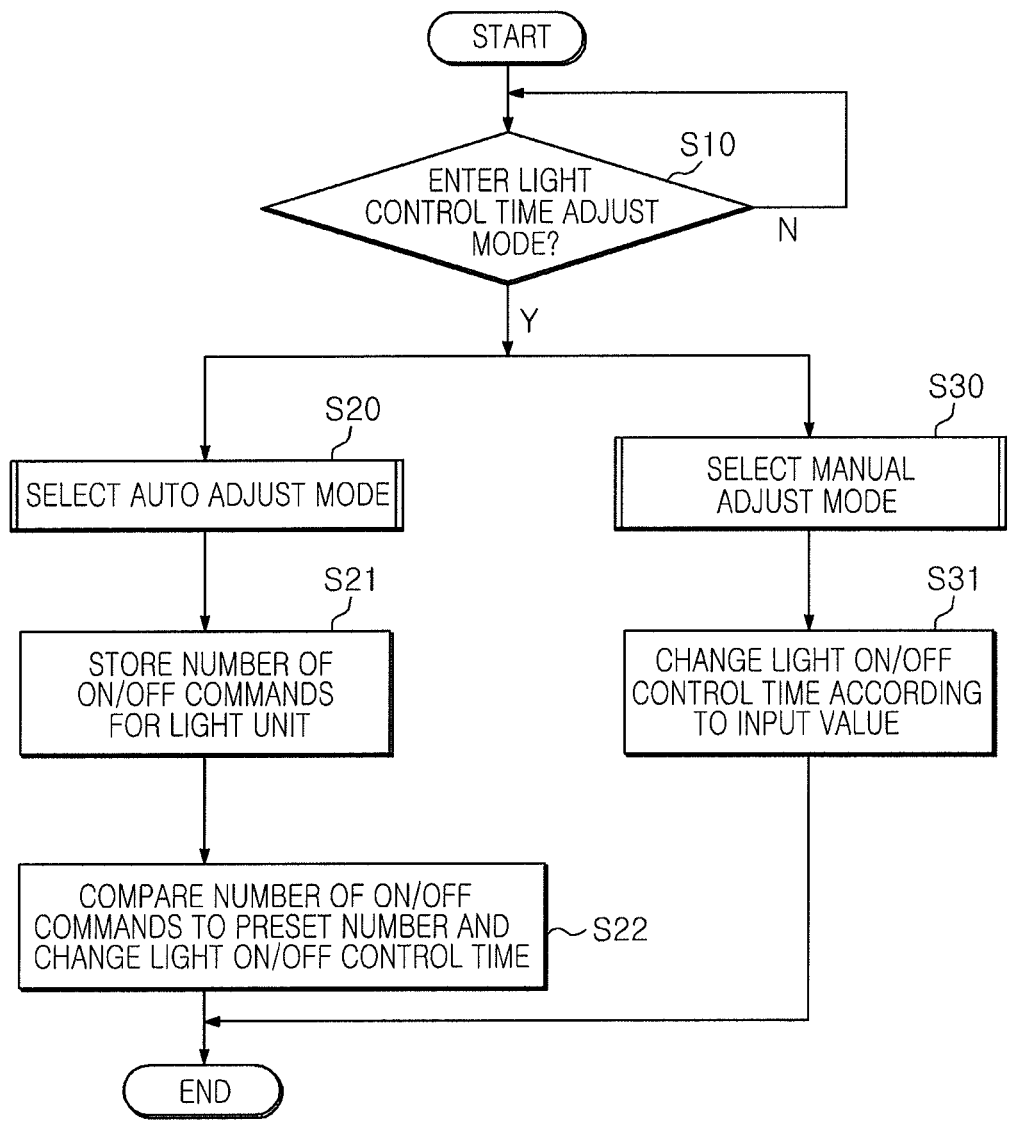

LIGHT CONTROL APPARATUS AND METHOD FOR VEHICLE

CROSS-REFERENCES TO RELATED APPLICATIONS

The present application claims priority to Korean application number 10-2013-0142893, filed on Nov. 22, 2013, which is incorporated by reference in its entirety.

BACKGROUND OF THE INVENTION

The present invention relates to a light control apparatus and method for a vehicle, and more particularly, to a light control apparatus and method for a vehicle, which automatically controls a vehicle light according to the brightness of the road ahead of the vehicle and the road condition, using a navigation system.

In general, an auto-light function of a vehicle light transmits light amount data sensed through an optical sensor to a control unit and controls a light unit according to a determination result. Such a function has an advantage in that the vehicle light may be automatically controlled according to the change of light. However, since the optical sensor responds to only a preset value, the vehicle light is controlled in several seconds after the vehicle suddenly enters a tunnel or dark place. Thus, the stability of the vehicle light may be degraded.

For example, when an underground road way or mountain tunnel exists in front of the vehicle, the underground road way or mountain tunnel cannot be detected through the optical sensor in advance. Thus, the vehicle light is operated after the vehicle enters the underground road way or mountain tunnel and the surroundings become dark. In this case, since a driver has difficulties in securing a clear view in advance, the driver may feel inconvenience.

Furthermore, depending on the age, sex, or taste of each driver, a desired light on-off time may differ. However, the auto-light function is uniformly operated. Thus, although a vehicle is equipped with the auto-light function, the driver may feel inconvenience while manually operating the vehicle light.

For example, a driver having a bad night vision may want to turn on a vehicle light more quickly when the sun sets in the west. However, since the auto-light function using an optical sensor is operated only under a preset brightness condition, the reliability of the auto-light function may be degraded.

Thus, there is a demand for the development of an apparatus which predicts the change in brightness of the road ahead, varies a light control time, and flexibly controls a vehicle light according to a driver's taste.

The related art of the present invention is disclosed in Korean Patent Laid-open Publication No. 10-2013-0112116 published on Oct. 14, 2013 and entitled "Head lamp control system for vehicle and control method thereof".

SUMMARY OF THE INVENTION

An embodiment of the present invention is directed to a light control apparatus and method for a vehicle, which monitors the brightness and road condition around the vehicle in real time, using a navigation system and a telematics service, and predicts the change in brightness of the road ahead, thereby optimizing a light operation control time of the vehicle.

Another embodiment of the present invention is directed to a light control apparatus and method for a vehicle, which additionally includes an illumination sensor to more precisely determine the brightness of the road ahead, and changes a light operation control time according to a driver's taste.

In one embodiment, a light control apparatus for a vehicle, may comprise: an operation unit configured to receive a selection for an auto-light function; a control unit configured to determine whether or not a light operation condition is satisfied based on position information provided from a GPS module and plural pieces of information for operating a light unit, received through a wireless communication module, and output a light operating signal according to the determination result, when the auto-light function is selected through the operation unit; and a light control unit configured to operate a light unit according to the light operating signal provided from the control unit.

The plural pieces of information for operating the light unit may be collected from a telematics server through the wireless communication module, and the control unit may determine whether or not the light operation condition is satisfied based on information corresponding to a current position identified through the position information provided from the GPS module, among the plural pieces of information for operating the light unit.

The light control apparatus may further include a storage unit configured to store information on how many times at least one of on and off commands for the light unit is inputted from the operation unit, wherein when an auto adjust mode is selected through the operation unit, the control unit compares at least one of the number of on commands for the light unit and the number of off commands for the light unit, which are stored in the storage unit, to a preset number, and changes a control time of the light operating signal according to the comparison result.

When the number of on commands for the light unit is larger than the preset number, the control unit may control the light unit to be turned on earlier and turned off later than a predetermined time.

When the number of off commands for the light unit is larger than the preset number, the control unit may control the light unit to be turned on later and turned off earlier than a predetermined time.

The light control unit may vary an illumination level according to the light operating signal, and operate the light unit.

The light control apparatus may further include an illumination sensor configured to sense illumination around the vehicle, wherein the light control unit may control the light unit by further reflecting the illumination value inputted from the illumination sensor, or the control unit may further reflects the illumination value inputted from the illumination sensor when transmitting the light operating signal.

When a current position is not identified through the GPS module, the control unit may determine that the light operation condition is satisfied.

In another embodiment, a light control method for a vehicle may include: receiving, by a control unit, a selection for an auto-light function through an operation unit; receiving, by the control unit, position information from a GPS module and receiving plural pieces of information for operating a light unit through a wireless communication module, when the selection for the auto-light function is inputted through the operation unit; determining, by the control unit, whether or not a light operation condition is satisfied based on the position information and the plural pieces of information for operating the light unit; transmitting, by the control unit, a light operating signal to a light control unit according to the determination result; and operating, by the light control unit, the light unit according to the light operating signal.

In the receiving of the plural pieces of information for operating the light unit, the control unit may receive information for operating the light unit, corresponding to a current position identified through the GPS module, among the plural pieces of information for operating the light unit which are collected through communication with a telematics server by the wireless communication module.

The light control method may further include comparing, by the control unit, at least one of the number of on commands for the light unit and the number of off commands for the light unit, which are stored in the storage unit, to a preset number, and changing a control time of the light operating signal according to the comparison result, when an auto adjust mode is selected through the operation unit.

When the number of on commands for the light unit is larger than the preset number, the control unit may control the light unit to be turned on earlier and turned off later than a predetermined time.

When the number of off commands for the light unit is larger than the preset number, the control unit may control the light unit to be turned on later and turned off earlier than a predetermined time.

When a current position is not identified through the GPS module, the control unit may determine that the light operation condition is satisfied.

The light control apparatus and method for a vehicle in accordance with the embodiment of the present invention may monitor the brightness and road condition around the vehicle in real time, using a navigation system of the vehicle and a telematics service, predict the change in brightness of the road ahead, and optimize the light operation control time of the vehicle. Thus, it is possible to secure the safety of traffic and improve the stability of the apparatus.

Furthermore, the illumination sensor may be added to more precisely determine the brightness of the road ahead, and the light operation control time may be changed depending on a driver's taste, which makes it possible to improve a user's satisfaction.

BRIEF DESCRIPTION OF THE DRAWINGS

FIG. 3 is a flowchart illustrating an operation of changing a light unit control time in the light control method for a vehicle in accordance with the embodiment of the present invention.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
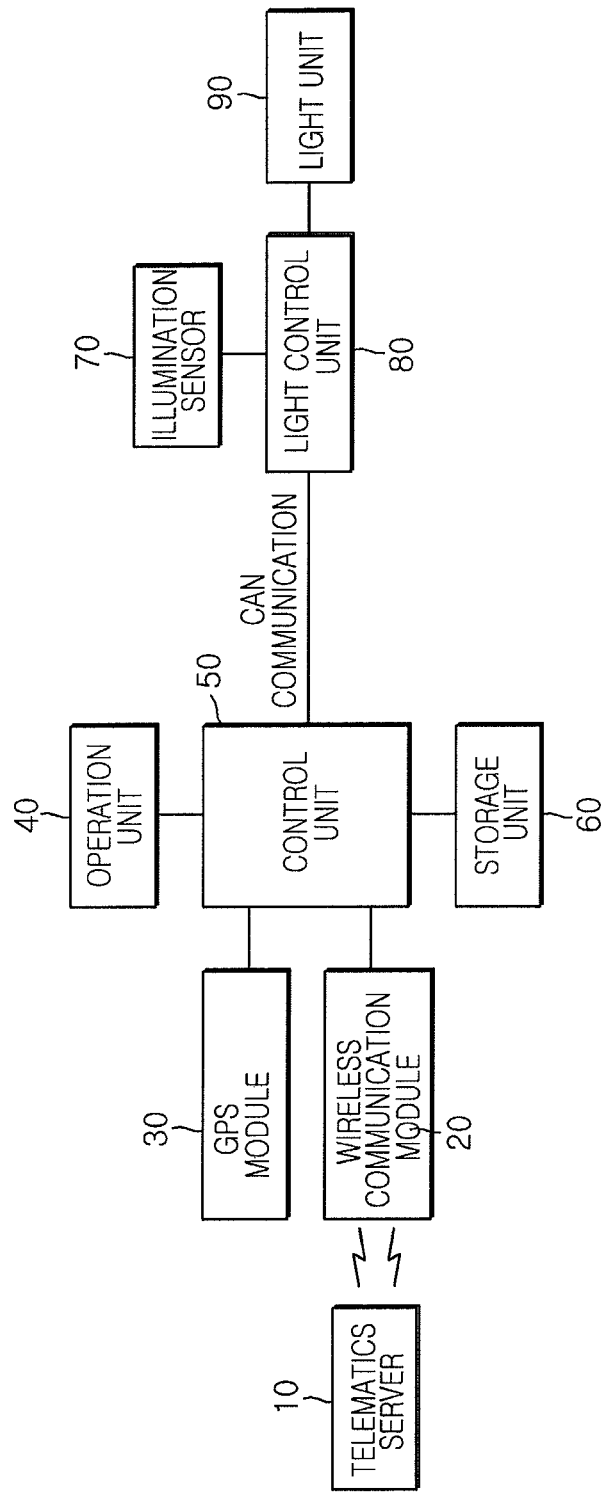
FIG. 1 is a block configuration diagram illustrating a light control apparatus for a vehicle in accordance with an embodiment of the present invention.

FIG. 1 is a block configuration diagram illustrating a light control apparatus for a vehicle in accordance with an embodiment of the present invention.

As illustrated in FIG. 1, the light control apparatus for a vehicle in accordance with the embodiment of the present invention may include a wireless communication module 20, a GPS module 30, an operation unit 40, a control unit 50, a storage unit 60, an illumination sensor 70, a light control unit 80, and a light unit 90.

A telematics server 10 may provide a traffic guidance service and an infotainment (information+entertainment) service to a vehicle, using position information and wireless communication networks, for example, CDMA, WiBro, WiFi, BT and the like.

For example, the telematics server 10 may include the Mozen system which operates vehicle telematics information. The Mozen system is a telematics service of Hyundai-Kia Motor Company. When the Mozen server collects information and transmits the collected information to the vehicle periodically or in real time, the information is provided to a navigation system of the vehicle through the wireless communication module 20.

Alternatively, desired information may be provided from specific organizations (for example, the Nation Weather Service, the Urban Expressway Traffic Management Center, and portal sites) through an application installed in the navigation system of the vehicle.

The wireless communication module 20 may collect information through communication with the telematics server 10 and transmit the collected information to the control unit 50.

The GPS module 30 may identify a current position by receiving three or more satellite signals and transmit the identified current position to the control unit 50.

The operation unit 40 may include a light operating switch to receive a command related to a light operation from a user, and may receive an on-off operation for auto-light function, a mode operation for adjusting a control time of the light unit 90, and an on-off manual operation for the light unit 90.

When the auto-light function is turned on through the operation unit 40, the control unit 50 may receive information for operating the light unit 90 from the GPS module 30 and the wireless communication module 20, determine whether or not the received information satisfies a light operation condition, and transmit a light operating signal to the light control unit 80 according to the determination result.

More specifically, the control unit 50 may receive information corresponding to the current position identified through the GPS module 30, among plural pieces of information for operating the light unit 90 which are collected through communication with the telematics server 10 by the wireless communication module 20, and determine whether or not the received information satisfies the light operation condition.

At this time, the plural pieces of information for operating the light unit 90 may include a sunrise and sunset time for each region, danger (accident) areas, weather information (clear, cloudy, or rainy day) and the like. When the wireless communication module 20 collects information for operating the light unit 90 through communication with the telematics server 10, the control unit 50 may receive information for operating the light unit 90, corresponding to the current position identified through the GPS module 30, and determine whether or not the received information satisfies the light operation condition.

Furthermore, the control unit 50 may determine whether it is a daytime or nighttime, from the sunrise and sunset time. More specifically, the control unit 50 may determine whether it is a daytime or nighttime with a time error, according to the time at which the change of brightness occurs. When determining that it is a nighttime or the vehicle enters a danger area (for example, tunnel, merging roads, or accident area) or determining that the weather condition is bad (for example, cloudy, rainy, or foggy), the control unit 50 may determine that the light operation condition is satisfied.

Furthermore, even when a current position is not identified through the GPS module 30, the control unit 50 may determine whether or not the light operation condition is satisfied.

The storage unit 60 may store information on how many times an on/off operation or command for the light unit 90 is inputted from the operation unit 40.

At this time, the storage unit 60 may include a memory device capable of storing data, such as flash memory, HDD, SSD, or moviNAND.

At this time, when an auto-adjust mode is inputted from the operation unit 40, the control unit 50 may compare the number of on/off commands for the light unit 90, stored in the storage unit 60, to a preset number and then change the control time of the light operating signal according to the comparison result.

That is, the storage unit 60 may store information on how many times the light unit 90 is manually operated by a driver, in order to understand the taste of the driver. According to the taste of the driver, the light unit 90 may be controlled.

The light control unit 80 may vary an illumination level according to the light operating signal transmitted from the control unit 50, and control the operation of the light unit 90.

At this time, the light control unit 80 may include a body control module (BCM) which receives a light operating signal through vehicle CAN communication with the control unit 50. The light control unit 80 may vary the illumination level according to the light operating signal, and control the on-off operation for the light unit 90.

Furthermore, the light control unit 80 may control the operation of the light unit 90 by reflecting an illumination value inputted from the illumination sensor 70. That is, the light control unit 80 may adjust on/off time of the light unit 90 within a specific time range based on an illumination value inputted from the illumination sensor 70.

The light unit 90 may include a head light installed in the vehicle.

As described above, the light control apparatus for a vehicle in accordance with the embodiment of the present invention may monitor the brightness and the road condition around the vehicle in real time, using the navigation system of the vehicle and the telematics service, predict the change in brightness of the road ahead, and optimize the light operation control time of the vehicle. Thus, it is possible to secure the safety of traffic and improve the stability of the apparatus.

Furthermore, the illumination sensor may be added to more precisely determine the brightness of the road ahead, and the light operation control time may be changed depending on a driver's taste, which makes it possible to improve a user's satisfaction.

Figure 2:
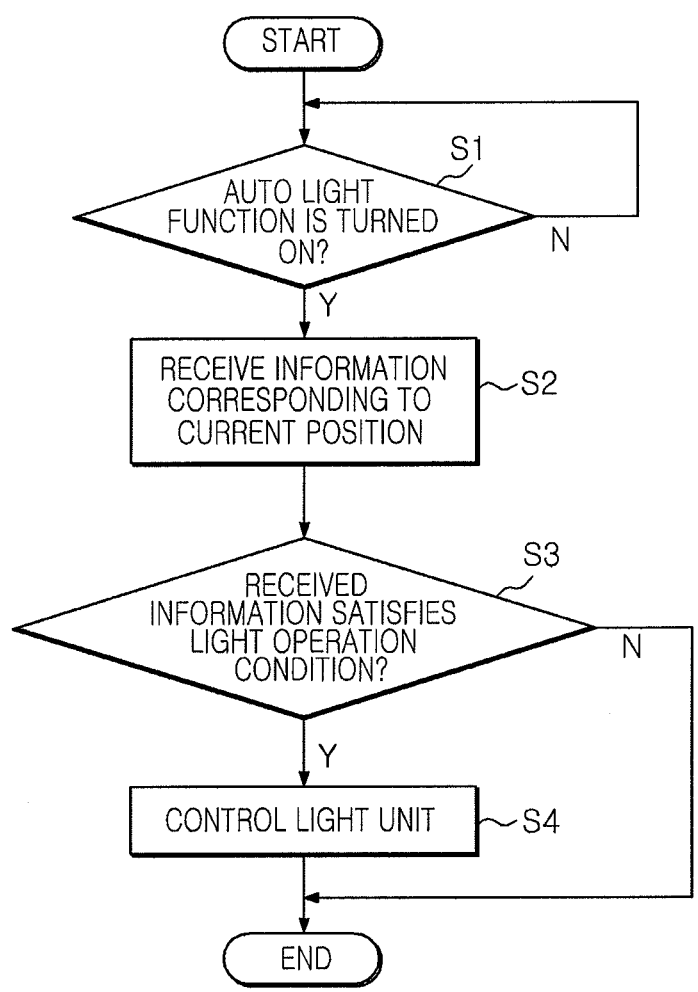
FIG. 2 is a flowchart illustrating a light control method for a vehicle in accordance with an embodiment of the present invention.

FIG. 2 is a flowchart illustrating a light control method for a vehicle in accordance with an embodiment of the present invention. FIG. 3 is a flowchart illustrating an operation of changing a light unit control time in the light control method for a vehicle in accordance with the embodiment of the present invention. Referring to FIGS. 2 and 3, the light control method for a vehicle in accordance with the embodiment of the present invention will be described.

First, when the auto-light function is turned on through the operation unit 40 at step S1, the control unit 50 may receive information for operating the light unit 90, corresponding to a current position, from the GPS module 30 and the wireless communication module 20 at step S2.

At this time, the operation unit 40 may include a light operating switch to receive a manual operation or command from a user, and may receive an on-off operation for auto-light function, a mode operation for adjusting the control time of the light unit 90, and an on-off manual operation for the light unit 90.

Then, the control unit 50 may determine whether or not the information for operating the light unit 90, received at step S2, satisfies a light operation condition, at step S3.

At this time, the information for operating the light unit 90 may include a sunrise and sunset time for each region, danger (accident) areas, weather information (clear, cloudy, or rainy day) and the like. When the wireless communication module 20 collects plural pieces of information for operating the light unit 90 through communication with the telematics server 10, the control unit 50 may receive (extract) information for operating the light unit 90, corresponding to the current position identified through the GPS module 30, and determine whether or not the received information satisfies the light operation condition.

The control unit 50 may determine whether it is a daytime or nighttime, from the sunrise and sunset time. More specifically, the control unit 50 may determine whether it is a daytime or nighttime with a time error, according to the time at which the change of brightness occurs. When determining that it is a nighttime or the vehicle enters a danger area (for example, tunnel, merging roads, or accident area) or determining that the weather condition is bad (for example, cloudy, rainy, or foggy), the control unit 50 may determine that the light operation condition is satisfied.

Furthermore, when a current position is not identified through the GPS module 30, the control unit 50 may determine that the light operation condition is satisfied.

Then, the control unit 50 may transmit a light operating signal to the light control unit 80 according to the determination result of step S3, and the light control unit 80 may vary an illumination level according to the transmitted light operating signal and control the operation of the light unit 90, at step S4.

At this time, the light control unit 80 may control the operation of the light unit 90 by reflecting an illumination value inputted from the illumination sensor 70. Furthermore, depending on embodiments, the control unit 50 may further reflect the illumination value inputted from the illumination sensor 70 when transmitting the light operating signal. That is, the light control unit 80 or the control unit 50 may adjust on/off time of the light unit 90 within a specific time range based on an illumination value inputted from the illumination sensor 70.

Furthermore, as illustrated in FIG. 3, the light control method for a vehicle in accordance with the embodiment of the present invention may change the control time of the light operating signal and change the operation control time of the light unit 90. This process may be performed as follows.

First, when a mode is selected and inputted through the operation unit 40, the process may enter a light control time adjust mode at step S10. At this time, when the selected mode is an auto adjust mode at step S20, the control unit 50 may store information on how many times an on/off command for the light unit 90 is inputted, into the storage unit 60 at step S21.

The control unit 50 may compare the number of on/off commands for the light unit 90, stored in the storage unit 60, to a preset number and then change the control time of the light operating signal according to the comparison result, at step S22.

More specifically, when the number of on commands for the light unit 90 is larger than the preset number, the control unit 50 may determine that a driver actually feels that it is dark, and control the light unit 90 to be turned on earlier and turned off later than a predetermined time.

Furthermore, when the number of off commands for the light unit 90 is larger than the preset number, the control unit 90 may determine that the driver actually feels that it is bright, and controls the light unit 90 to be turned on later and turned off earlier than a predetermined time.

On the other hand, when the selected mode is a manual adjust mode at step S30, the control unit 50 may change the control time of the light operating signal to a value inputted from the driver at step S31.

As described above, the light control method for a vehicle in accordance with the embodiment of the present invention may monitor the brightness and the road condition around the vehicle in real time, using the navigation system of the vehicle and the telematics service, predict the change in brightness of the road ahead, and optimize the light operation control time of the vehicle. Thus, it is possible to secure the safety of traffic and improve the stability of the apparatus.

Furthermore, the illumination sensor may be added to more precisely determine the brightness of the road ahead, and the light operation control time may be changed depending on a driver's taste, which makes it possible to improve a user's satisfaction.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A light control apparatus for a vehicle, comprising:
an operation unit configured to receive a driver's selection for an auto-light function of the vehicle;
a control unit configured to determine whether or not a predetermined light operation condition is satisfied based on position information provided from a GPS module of the vehicle and further based on information about surroundings of the vehicle through a wireless communication module of the vehicle, herein the control unit is further configured to output a light operating signal according to the determination when the auto-light function is selected; and
a light control unit configured to operate a light unit of the vehicle according to the light operating signal provided from the control unit, and
a storage unit configured to store the number of the driver's on commands for turning on the light unit and the number of the driver's off command for turning off the light unit;
wherein the control unit is configured to compare at least one of the number of the on commands and the number of the off commands to a preset number, wherein the control unit is further configured to adjust timing for the light control unit's operation of the light unit based on the comparison.

2. The light control apparatus of claim 1, wherein the plural information about surroundings of the vehicle is collected from a telematics server through the wireless communication module, and
the control unit determines whether or not the light operation condition is satisfied based on information corresponding to a current position identified through the position information provided from the GPS module.

3. The light control apparatus of claim 1, wherein when the number of on commands for the light unit is larger than the preset number, the control unit controls the light unit to be turned on earlier and turned off later than a predetermined time.

4. The light control apparatus of claim 1, wherein when the number of off commands for the light unit is larger than the preset number, the control unit controls the light unit to be turned on later and turned off earlier than a predetermined time.

5. The light control apparatus of claim 1, wherein the light control unit varies an illumination level according to the light operating signal, and operates the light unit.

6. The light control apparatus of claim 5, further comprising an illumination sensor configured to sense illumination around the vehicle,
wherein the light control unit controls the light unit by further reflecting the illumination value inputted from the illumination sensor, or the control unit further reflects the illumination value inputted from the illumination sensor when transmitting the light operating signal.

7. The light control apparatus of claim 1, wherein when a current position is not identified through the GPS module, the control unit determines that the light operation condition is satisfied.

8. A light control method for a vehicle, comprising:
receiving, by a control unit, a driver's selection for an auto-light function of the vehicle through an operation unit;
receiving, by the control unit, position information from a GPS module of the vehicle,
receiving information about surroundings of the vehicle through a wireless communication module of the vehicle;
determining, by the control unit, whether or not a predetermined light operation condition is satisfied based on the position information and the information about surroundings of the vehicle;
transmitting, by the control unit, a light operating signal to a light control unit according to the determination; and
operating, by the light control unit, the light unit according to the light operating signal;
storing, in a storage unit, the number of the driver's on commands for turning on the light unit and the number of the driver's off commands for turning off the light unit;
comparing, by the control unit, at least one of the number of the on commands and the number of the off commands to a preset number; and
adjusting timing for the light control unit's operation of the light unit based on the comparison.

9. The light control method of claim 8, wherein in the receiving of the plural information about surroundings of the vehicle,
the control unit receives information about surroundings of the vehicle, corresponding to a current position identified through the GPS module, through communication with a telematics server by the wireless communication module.

10. The light control method of claim 8, wherein when the number of on commands for the light unit is larger than the preset number, the control unit controls the light unit to be turned on earlier and turned off later than a predetermined time.

11. The light control method of claim 8, wherein when the number of off commands for the light unit is larger than the preset number, the control unit controls the light unit to be turned on later and turned off earlier than a predetermined time.

12. The light control method of claim 8, wherein when a current position is not identified through the GPS module, the control unit determines that the light operation condition is satisfied.

* * * * *